(12) United States Patent
Zafarifar et al.

(10) Patent No.: US 8,773,595 B2
(45) Date of Patent: Jul. 8, 2014

(54) IMAGE PROCESSING

(75) Inventors: Baham Zafarifar, Eindhoven (NL); Abraham Karel Riemens, Eersel (NL)

(73) Assignee: Entropic Communications, Inc., San Diego, CA (US)

( * ) Notice: Subject to any disclaimer, the term of this patent is extended or adjusted under 35 U.S.C. 154(b) by 184 days.

(21) Appl. No.: 13/141,688

(22) PCT Filed: Dec. 11, 2009

(86) PCT No.: PCT/IB2009/055696
§ 371 (c)(1), (2), (4) Date: Jun. 22, 2011

(87) PCT Pub. No.: WO2010/073177
PCT Pub. Date: Jul. 1, 2010

(65) Prior Publication Data
US 2011/0261264 A1    Oct. 27, 2011

(30) Foreign Application Priority Data
Dec. 24, 2008   (EP) .................................... 08106033

(51) Int. Cl.
*H04N 5/14* (2006.01)
*G09G 5/00* (2006.01)
*H04N 7/12* (2006.01)

(52) U.S. Cl.
USPC ..................... 348/699; 345/606; 375/240.16

(58) Field of Classification Search
CPC ..... H04N 5/145; H04N 7/26765; H04N 7/50; H04N 7/26244; H04N 7/364; G06T 2207/10016; G06T 7/2013
USPC ............... 348/699; 375/240, 240.16; 345/606
See application file for complete search history.

(56) References Cited

U.S. PATENT DOCUMENTS 5,534,946 A    7/1996   De Haan et al.
6,487,313 B1   11/2002  De Haan et al.
(Continued)

FOREIGN PATENT DOCUMENTS

EP        1 990 997 A1    11/2008
WO     2007/099465 A2     9/2007

OTHER PUBLICATIONS

Ojo, et al., "Robust Motion-Compensated Video Upconversion," IEEE Transactions on Consumer Electronics, vol. 43, Issue 4, pp. 1045-1056, Nov. 1997.

(Continued)

*Primary Examiner* — Dave Czekaj
*Assistant Examiner* — Tsion B Owens
(74) *Attorney, Agent, or Firm* — Richard Bachand; Duane Morris LLP

(57) ABSTRACT

A method of processing video signals containing multiple images. The method comprises dividing a first image into regions and associating a first plurality of regions of the first image with a first image layer and a second plurality of regions of the first image with a second image layer. Motion estimation is performed on pixel values that are derived from pixel values associated with the first image layer, substantially in isolation from pixel values associated with the second image layer, to generate a first motion vector field, and the first motion vector field is used to perform motion-compensated processing on pixel values that are derived from pixel values associated with the first image layer. The result of the motion-compensated processing is combined with pixel values that are derived from pixel values associated with the second image layer to generate an output image.

20 Claims, 5 Drawing Sheets

(56) References Cited

U.S. PATENT DOCUMENTS

| | | |
|---|---|---|
| 7,023,917 B2 | 4/2006 | Nesvadba et al. |
| 2002/0154695 A1* | 10/2002 | Cornog et al. ............ 375/240.16 |
| 2009/0016640 A1* | 1/2009 | Klein Gunnewiek ......... 382/276 |
| 2009/0214078 A1* | 8/2009 | Kuo .............................. 382/103 |
| 2009/0231314 A1* | 9/2009 | Hanaoka et al. .............. 345/208 |
| 2010/0289815 A1* | 11/2010 | Varekamp et al. ............ 345/606 |

OTHER PUBLICATIONS

Bellers, E., "Halo-Reduced National Motion," NXP B.V., Rev. 1.1, pp. 1-53, Sep. 2007.

De Haan, et al., "Graceful Degradation in Motion-Compensated Field-Rate Conversion," Philips Resarch Laboratories, Eindhoven, NL., pp. 249-256, 1994.

L. Agnihotri et al., "Multi-layered videotext extraction method", Proceedings of IEEE International Conference on Multimedia and Expo, 2002, vol. 2, pp. 213-216 vol. 2.

Gerard de Haan, "Digital Video Post Processing", Royal Philips Electronics N.V. 2006, pp. 167-171.

* cited by examiner

IMAGE PROCESSING

The invention relates to methods and apparatus for image processing, and in particular to methods of motion estimation and motion-compensated processing of images having foreground regions and background regions, wherein objects belonging to foreground regions and background regions have different velocities.

Some television sets employ motion estimation and motion compensated image enhancement operations to perform motion-compensated picture-rate up-conversion. The basic idea of this technology is to perform motion estimation to determine the movement of parts of an image in a video stream and generate motion vectors that define the trajectory of each part of the image between consecutive frames. The motion vectors can be generated by comparing image parts of a first frame with image parts of an adjacent frame and identifying the location of the parts of the image of the adjacent frames that most closely match the image part in the first frame. Motion compensation is then performed to place the parts of the image along the motion vector trajectories to generate one or more new frames that are to be interleaved between the consecutive input frames thereby increasing the picture rate.

In this way, temporal interpolation is performed along the object motion trajectory between two consecutive frames, such that the position of objects in a scene are placed at an intermediate position in the new interleaved frame, rather than keeping the objects in the same position as in one of the input frames. In this way, a new frame is generated that can be interleaved between the input frames to increase the frame rate and retain a high quality video signal featuring smooth motion portrayal. An example of picture-rate up-conversion is described in relation to FIG. 1.

FIG. 1a illustrates graphically a picture-rate up-conversation from a 25 Hz video stream 100 to a 50 Hz video stream 102. The initial 25 Hz video stream 100 comprises three input frames 104, 106, 108 and the resultant 50 Hz video stream comprises the same three input frames 104, 106, 108 along with two interleaved frames 110, 112 that have been interleaved between the input images 104, 106, 108. The objects displayed in the two interleaved frames 110, 112 are located at predicted spatial positions that are equidistant between the spatial positions of the same objects in the adjacent input frames 104, 106, 108.

In order to generate the interleaved frames 110, 112, motion estimation is performed on the input frames 104, 106, 108 to determine motion vectors that describe the transformation of blocks of the image between consecutive input frames 104, 106, 108. In some embodiments, the motion vectors may relate to the whole image (global motion estimation) or specific parts, such as rectangular blocks, or even single pixels. The motion vectors are used to represent the relative movement of parts of an image from one frame to the next, and are used to predict the spatial position of objects in the interleaved frames 110, 112 that will be temporally interleaved between the input frames 104, 106, 108.

Block matching is a known method of generating motion vectors. Block matching comprises dividing a current frame into a number of blocks of pixels, with the aim of, for each block in the current frame, identifying a block in the previous frame that most closely relates to (resembles) the block of the current frame.

In order to do this, a plurality of candidate vectors are identified for the block of the current frame, wherein each candidate vector plots a trajectory from the current block to a candidate block.

The pixel values (for example luminance values) of each pixel location within the block of the current frame is compared with the pixel values at corresponding pixel locations in each of the candidate blocks in the frame to be matched, in order to determine how similar those pixels are. The frame to be matched may be the previous frame, the frame before the previous frame, the next frame or any other frame for which block matching is required. Once all of the pixel values for a candidate block have been evaluated, a calculation can be performed to determine a similarity value representing how similar the candidate block is with the block of the current frame. In this way, the candidate block with the highest similarity value, and thereby the best candidate motion vector can also be identified. Candidate blocks may be restricted to within a maximum offset from the current block. For example, all blocks that are not more than 16 pixels away from the current block in any direction may be considered as candidate blocks.

FIG. 1b illustrates an example of a block matching operation to determine a best-fit motion vector in order for temporal interpolation between input frames 104 and 106 to be performed to generate new interleaved frame 110.

An example block is shown as reference 114 and is a sub-area of the frame. The block in a current frame 106 is illustrated as 114a and the same block position in the previous frame 104 is reference 114b.

A first step of block matching is to identify a plurality of candidate vectors that each point to a block of pixels in the current frame 106, wherein each of the candidate blocks has the same dimensions as the block to be matched. Three candidate blocks are illustrated in FIG. 1b as 118a, 118b and 118c. It will be appreciated that these are not necessarily a complete set of candidate blocks.

The luminance of each pixel within the block 114b in the earlier frame 104 is then compared with the luminance of the pixel at the corresponding pixel location in each of the candidate blocks 118 in the current frame 106 to generate a value that is indicative of the similarity of the luminance each of the pixels. The values for the comparisons of each pixel within a candidate block 118 are then summed to provide an indication of the degree of similarity between the candidate block 118 in the current frame 106 and the block 114b that is to be matched in the earlier frame 104.

This similarity metric is a matching procedure known as the sum of absolute differences (SAD) technique and is implemented by taking the absolute pixel value difference between two corresponding pixels taken over the pixel pairs of the block.

The SAD values for each of the candidate blocks 118 are then compared, and the candidate block 118 having the lowest value is determined as the best match. In this example, candidate block 118a is determined as the best match as its pixel values most closely correspond to the pixel values of the block to be matched 114a in the current frame 106.

Having identified the best matched candidate block 118a, the corresponding candidate vector between the location of the earlier block 114b and the location of the best matched candidate block 118a is recorded as the motion vector for the earlier block 114b in order to track the movement of object parts represented by pixels in the earlier block 114b. The determined motion vector 116 from the earlier frame 104 to the current frame 106 is shown graphically in FIG. 1b.

After the motion vectors 116 for all of the blocks in the earlier frame 104 have been determined, the pixels of the earlier image 104 can be interpolated along those vectors 116 to generate the new intermediate image 110. Image processing operations along motion vectors are referred to as motion compensated processing.

However, known motion compensation enhancement methods can provide suboptimal results or artifacts near the boundaries of moving objects. A known artifact is the so-called "halo" effect, which typically occurs around objects with different velocities. Halos can appear as blurred and/or distorted background areas around the moving object, for example as "shadows" of subtitle characters in the background of an image. Halos can also appear as shredded copies of a subtitle overlaid on the background, and/or ghost replicas of the subtitle being displayed in the background. It will be appreciated that halos are not limited to subtitles and can occur for any objects that have different velocities in a scene.

The halo effect is related to the imperfection of motion estimation around the boundaries of moving objects, due to inaccurate calculation of motion vectors in areas that are becoming covered or uncovered in the image, known as occlusion and disocclusion, amongst other things. Motion compensated processing of images having subtitles is known to generate halo artifacts in the vicinity of the subtitles.

The inaccurate determination of motion vectors can result, during a motion compensation stage of processing, in spatial and temporal artifacts near the stationary region.

An example of motion vectors 128 that are correctly determined for a frame 120 that has no subtitles is shown as FIG. 1c, and an example of inaccurate motion vectors 130 that are determined for a corresponding frame 122 with subtitles are shown as FIG. 1d.

Both frames 120, 122 consists of three objects 124 that are moving from right to left in the background. FIG. 1d also shows subtitles 126 that are stationary in the foreground of the frame 122.

It can be seen that the motion estimation processing is unable to correctly determine the motion vectors in the region of the subtitles 126 for frame 122. This inaccuracy of motion estimation is mainly due to the fact that the block grid of (block-based) motion estimation is rather large and does not generally align with the boundaries of objects. This means that, in the block matching operation, the blocks positioned at the boundaries of the foreground objects contain pixels both from the foreground object and from the background object. Since each object has a different velocity, the determined motion vector for such blocks will be inaccurate. This inaccurate motion vector is further assigned to the pixels of the current block, and as such, the error will be propagated to the processed image.

In order to alleviate the halo problem, practical motion-compensated solutions employ techniques such as static, dynamic and cascaded medians, or occlusion adapted interpolation, such as those disclosed in Ojo, O. A., de Haan, G., "Robust motion-compensated video upconversion", IEEE Transactions on Consumer Electronics, Volume 43, Issue 4, November 1997 Page(s): 1045-1056. However, artifacts in stationary, high-contrast regions such as subtitles, logos, text or DVD menus can remain thereby degrading the quality of the video stream, which can be annoying to a person watching the moving images.

It is an object of the invention to address one or more of the above problems.

According to a first aspect, the invention provides a method of processing video signals representing multiple images, comprising:

dividing a first image into regions;
associating a first plurality of regions of the first image with a first image layer and a second plurality of regions of the first image with a second image layer;
performing motion estimation on pixel values that are derived from pixel values associated with the first image layer, substantially in isolation from pixel values associated with the second image layer, to generate a first motion vector field;
using the first motion vector field to perform motion-compensated processing on pixel values that are derived from pixel values associated with the first image layer; and
combining the result of the motion-compensated processing with pixel values that are derived from pixel values associated with the second image layer to generate an output image.

It will be appreciated that performing motion estimation on pixel values that are derived from pixel values associated with the first image layer substantially in isolation from pixel values associated with the second image layer, can include embodiments where no motion estimation is performed on pixel values derived from pixel values associated with the second layer and can also include embodiments where motion estimation is performed on only a small number of pixel values derived from the pixel values associated with the second image layer such that those pixel values do not substantially effect the results of the motion estimation.

It will also be appreciated that the pixel values that are derived from pixel values associated with the second image layer that are combined with the result of the motion-compensated processing may be the original pixel values of regions/pixels associated with the second image layer, or may be pixel values that represent the results of processing performed on the pixel values associated with the second image layer. Such processing may include a filtering operation, motion estimation and/or motion compensated processing, such as that described in accordance with embodiments herein.

The second image layer may comprise an overlay layer, which may represent one or more of subtitles, a logo, a user-interface menu, a stationary object, and running text. The user interface menu may be a DVD menu or a digital television interface menu for example, and the running text may comprise subtitles scrolling across a screen. An overlay layer may represent any objects that are moving in a different way to other areas/regions of a scene represented by the video signals.

In some embodiments, the plurality of regions of the first and second layers may comprise information representative of pixel locations within an image, and in other embodiments the plurality of regions of the first and second layers may comprise information representative of pixel values, for example a value between 1 and 255 representing the colour of a pixel, or a luminance value for the pixel, while value 0 is used to represent that the pixel belongs to the foreground layer.

The pixel values that are derived from pixel values associated with an image layer may be derived in the same or different ways for specific features of embodiments described herein.

Dividing a first image into regions and associating a first plurality of regions of the first image with a first image layer and a second plurality of regions of the first image with a second image layer, may comprise segmentation processing, for example segmentation processing such that the first image layer represents background image regions and the second image layer represents foreground image regions.

According to a second aspect of the invention, there is provided data processing apparatus configured to perform the method of the first aspect of the invention.

According to a third aspect of the invention, there is provided a computer program configured to cause data processing apparatus to perform the method of the first aspect of the invention. The computer program may be stored on a carrier or computer program product, such as a disc, or may be embodied as a transient signal, such as an internet download.

The invention will now be described in detail by way of example only, with reference to the appended drawings, in which.

The following should not be construed as limiting the invention, which is to be defined by the appended claims.

Embodiments of the invention described herein can involve dividing an image into regions and associating a first plurality of regions to a first image layer and a second plurality of regions to a second layer. For convenience, we will refer to the first image layer as a background layer and the second image layer as a foreground layer. In some embodiments the foreground and background layers represent objects having different velocities, for example the background layer may represent moving objects whereas the foreground layer may represent stationary objects.

According to embodiments of the invention, motion estimation and motion compensated processing is performed on the pixel values derived from pixel values associated with the background layer, and not substantially on pixel values derived from pixel values associated with the foreground layer. In some embodiments, motion compensated processing is not performed on the input image, as inaccurate motion vectors can be generated by performing motion estimation on regions of the image that represent objects that are moving at a different velocity than other regions of the image. For example, performing motion compensated processing on and around stationary regions placed on a moving background can generate inaccurate motion vectors. After motion estimation and motion compensated processing is performed on pixel values derived from pixel values associated with the background layer, pixel values derived from pixel values associated with the foreground layer can be recomposed with the motion compensated background layer to generate an output image, which may be a recomposed motion-compensated image.

It will be appreciated that a pixel value can include a luminance value of a pixel, a representation of one or more colour components of a pixel, or any combination thereof.

Creating correct motion vectors based on pixel values associated with background areas surrounding a foreground area can be considered as a feature of this invention.

Figure 1A:
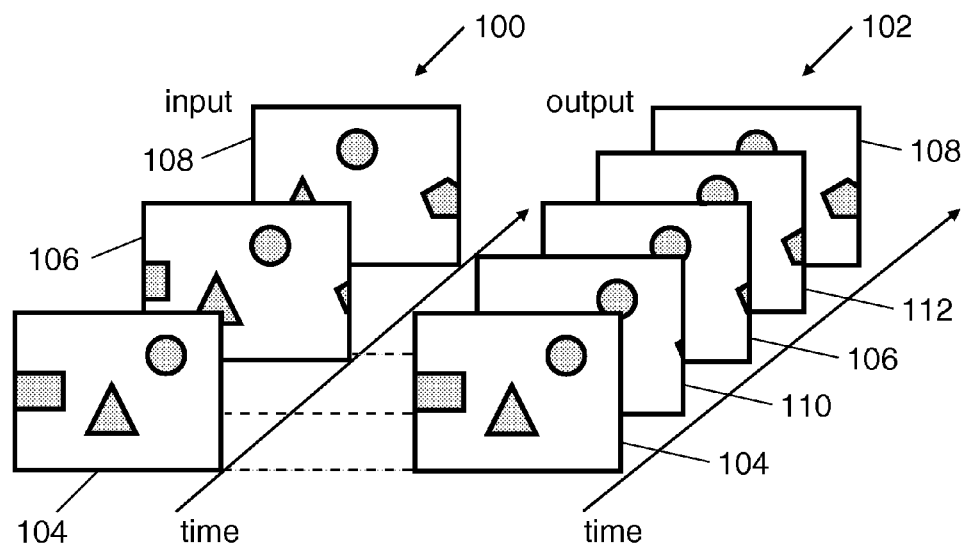
FIG. 1 illustrates schematically an example of motion estimation and compensation processing.
Figure 1B:
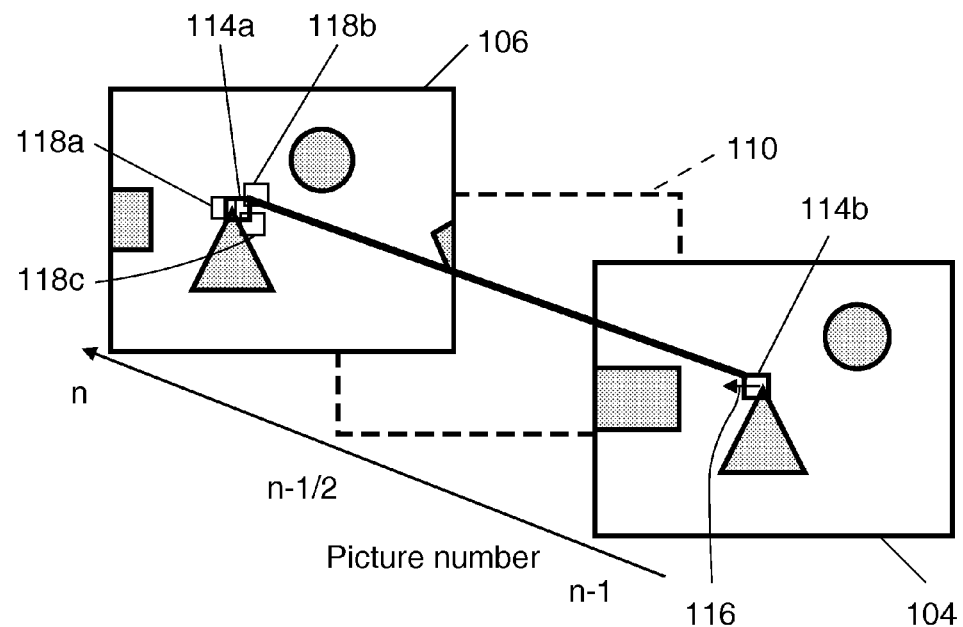
Figure 1C:
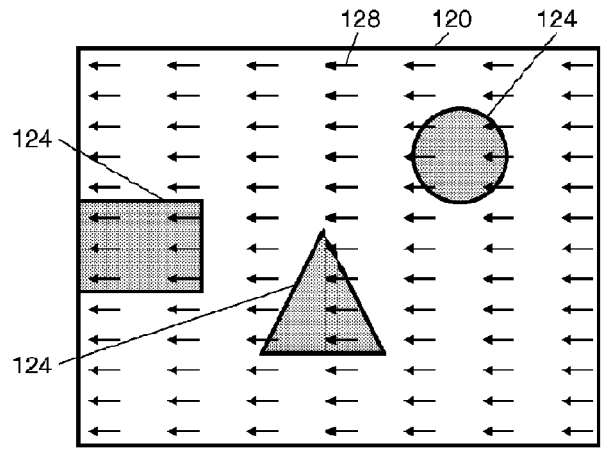
Figure 1D:
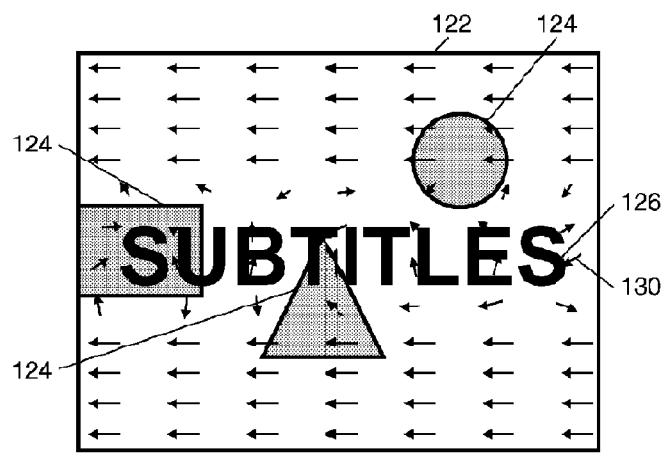
Figure 2:
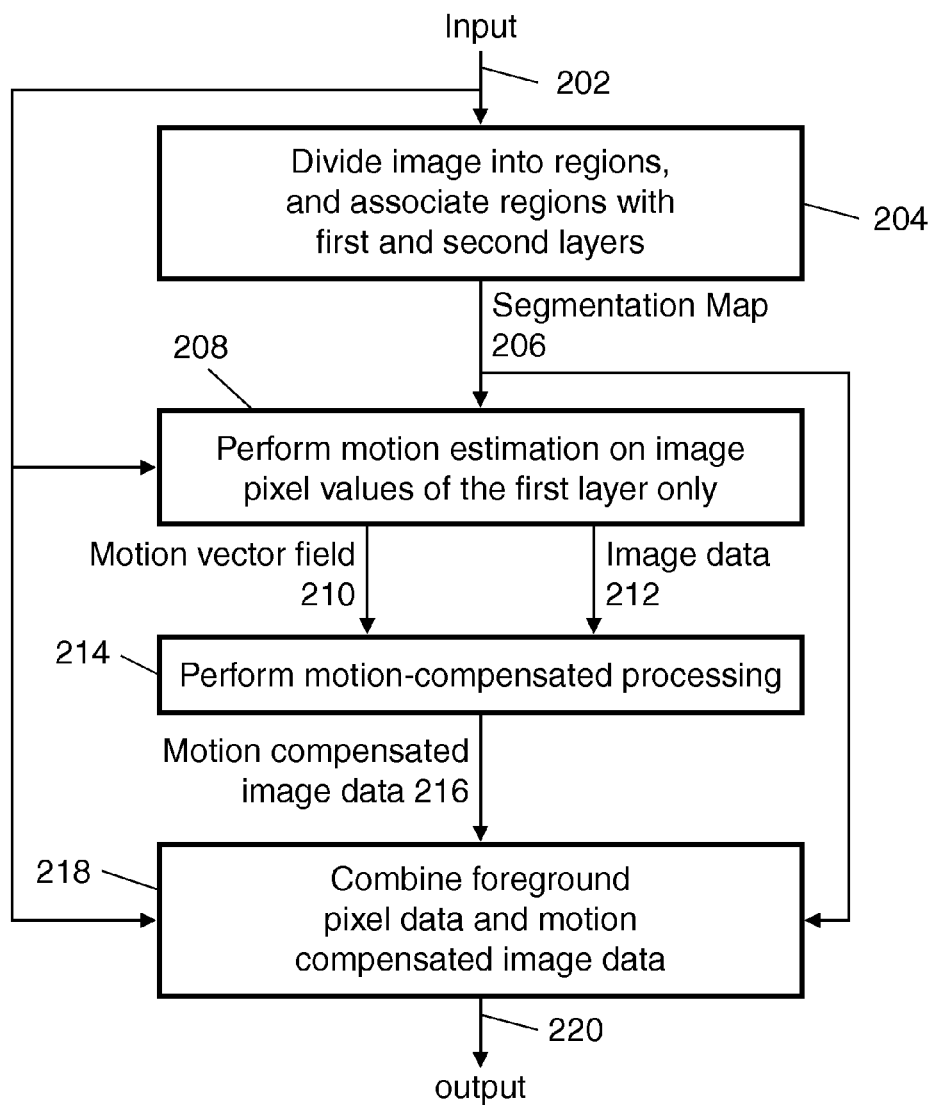
FIG. 2 illustrates a method of processing images according to an embodiment of the invention.

FIG. 2 illustrates an image processing method according to an embodiment of the present invention. Data representative of an input video stream comprising a sequence of images/frames is provided as input 202.

The input 202 is processed at step 204 to divide the images into regions and associate the regions with first and second layers. In this example a region is a single pixel, although in other embodiments, a region may be a plurality of pixels, for example a block of pixels. Associating the regions with a layer may be performed by a known method of segmentation.

The specific details of the segmentation methods that can be used are outside of the scope of this patent application, although the skilled man will be aware of a number of segmentation methods that are available in the art.

It will be appreciated that associating regions/pixels with a layer need not necessarily involve generating a separate array of data comprising just those pixels of a layer, but may involve storing an identifier of which pixels relate to which layer (for example in the form of a mask) so that, for example, subsequent processing can be performed on pixels associated with one layer to the exclusion of pixels associated with the other layer. This is described in more detail below.

In this example, the two layers are identified by a binary segmentation map 206 which comprises an array of bits, wherein each bit represents a pixel in a frame. A bit can be a logical 0 if it corresponds to a first layer, and a logical 1 if it corresponds to a second layer. Each of the image layers represent objects within the image that are moving at different velocities. For example, the first image layer may represent a background layer comprising moving objects in a scene, and the second image layer may represent a foreground layer comprising stationary subtitles.

In other embodiments, the segmentation map may be a probability-based segmentation mask that provides an array of values that represent a probability that a pixel belongs to a certain layer.

In embodiments where the foreground layer represents subtitles, the division and association at step 204 can detect and exploit relevant features such as the colour and texture of the foreground objects such as subtitles, as well as high-level information such as prior knowledge of the periodicity and time length of their occurrence in the video, or even their shape information. Examples of subtitle detection methods are described in U.S. Pat. No. 7,023,917 (Nesvadba et al).

The segmentation map 206 and the input video data 202 are provided as inputs to step 208, which is configured to perform motion estimation on data that represents image pixel values derived from the image pixel values associated with regions of the first layer, and not on image pixel values derived from regions associated with the second layer. Motion estimation can be performed by block matching as discussed before to generate a motion vector field 210. According to this embodiment, step 208 also generates image data 212 on which motion compensated processing will be performed. In some embodiments, the image data 212 may be the same as the input video data 202.

Performing motion estimation in this way can lead to an improved motion vector field 210 as image pixel values that relate to objects in a foreground of a scene are not taken into account when performing motion estimation on pixel values that relate to objects in a background of the scene.

In terms of a block matching operation, whereas the existence of both the foreground and the background pixels within a block resulted in inaccurate motion vectors in the prior art, in accordance with embodiments of the invention the motion vectors that are computed using pixel values of the background layer may not be influenced by the foreground regions of the image, since the background layer does not contain the pixel values of the foreground regions of the image. In other words, performing motion estimation on pixel values associated with the background layer only can reduce the chances of computing inaccurate motion vectors for the background regions, while performing motion compensation on pixel values associated with the background layer only can reduce the chances of artifacts being created in the processed image, since motion compensation can use exclusively pixel values associated with the background layer.

Different example embodiments for performing the motion estimation 208 on the data derived from the image pixel values associated with regions of the first layer, and not on image pixel values derived from regions associated with the second layer, are described in more detail with relation to FIG. 3 and equations (1) to (4) below.

In examples where the foreground regions represent subtitles, data representative of the pixel values of the subtitles can be removed prior to motion estimation as they do not represent moving objects within a scene for which motion estimation should be performed. This can enable more accurate motion vectors to be calculated for the remaining background regions, particularly the remaining background regions in the vicinity of the subtitles.

Data representative of the motion vector field 210 and data representative of the images 212 on which motion-compensated processing is to be performed are provided as inputs to step 214. Step 214 is configured to perform motion-compensated processing on the image data 212 in accordance with the vector field 210. The output of step 214 is motion-compensated image data 216.

At step 218, data representative of the pixel values associated with the second layer is combined with the motion compensated image data 216, and in the case of subtitles the combined output data 220 represents regions of the motion compensated first image layer with the second regions overlaid thereon. The method and the result of combination that is used may vary according to the image processing application at hand. The pixel values associated with the second layer regions may be obtained by applying the segmentation map 206 to the input video data 202.

The result of processing at step 218 is the output video stream of images 220 wherein the motion estimation and compensation of the images has been performed on data derived from pixel values associated with the background regions and not on data derived from pixel values associated with the foreground regions, and the pixel values representative of the foreground regions has been overlaid thereon after motion estimation and compensation.

Advantages associated with the embodiment illustrated in FIG. 2 can include preventing or reducing the influence by stationary objects when performing motion estimation and motion compensated processing on moving objects, particularly in areas surrounding the stationary objects. Such stationary objects can be considered to be in the foreground of the images that are processed, although, of course, in other embodiments the background layer may be considered to relate to stationary objects and the foreground layer to relate to moving objects. In such embodiments, the processing described and illustrated with regard to FIG. 2, and elsewhere herein, can be adjusted accordingly.

The terms foreground layer/regions and background layer/regions can be used to differentiate between regions of one or more pixels representative of objects having different velocities, and it does not matter whether the foreground layer/regions represent objects having higher velocities than the background layer/regions, or vice versa.

It will be appreciated that it may be possible to modify some or all of the steps illustrated in FIG. 2 such that motion estimation is performed on data derived from the image pixel values of regions of the second layer and not on image pixel values derived from regions of the first layer. This may be in addition to/or instead of performing the motion estimation described above in relation to step 208.

Figure 3:
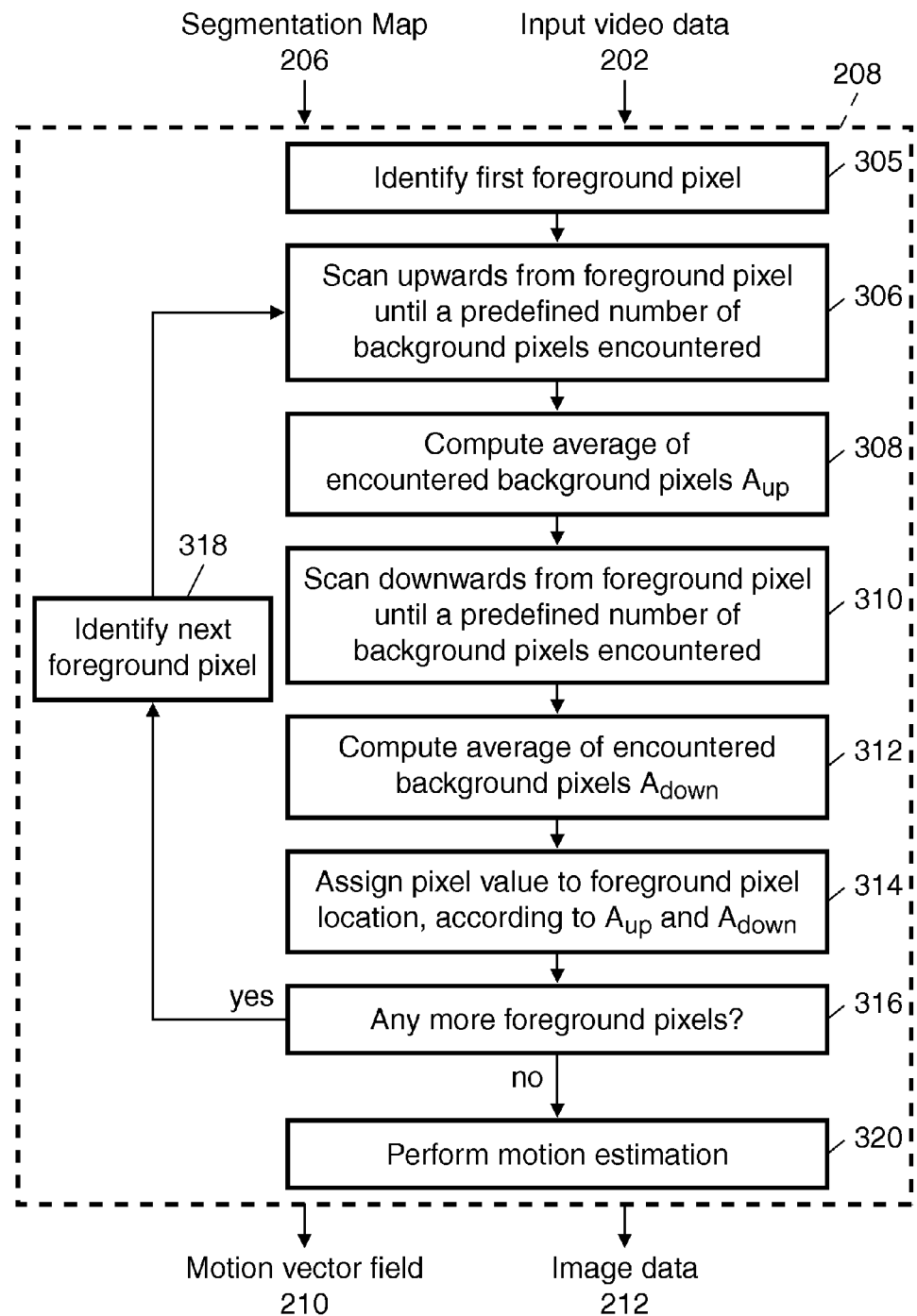
FIG. 3 illustrates a method of processing images according to another embodiment of the invention.

An embodiment of performing motion estimation on data derived from the image pixel values associated with regions of the first layer and not on image pixel values derived from regions associated with the second layer is described in relation to FIG. 3.

The embodiment of FIG. 3 includes a process known as "hole-filling" which identifies the pixels that correspond to foreground regions of the images and processes the foreground regions as if they are "holes" in the background video data. The holes are filled with pixel values that represent colours that are similar to the colour of the background pixels that are in the vicinity of the hole. Motion estimation is then performed on the "hole-filled" image. The hole-filling process that is illustrated in FIG. 3 has properties that are suitable for subtitle areas and has relatively low computational demand.

The method of FIG. 3 relates to step 208 of FIG. 2 which receives as inputs a segmentation map 206 and the input video data 202. At step 305, a first foreground pixel in the input video data is identified using the segmentation map 206. This first foreground pixel identifies the first hole that is to be filled.

At step 306, the input video data 202 is processed to scan upwards from the first foreground pixel in the image until a predefined number of background layer pixels are encountered. At step 308, an average $A_{up}$ of the pixel values of the background pixels that were encountered at step 306 is calculated. This average value $A_{up}$ represents the average colour of the background above the foreground pixel to be filled.

At step 310, for the same first foreground pixel that is to be filled, the input video data 202 is processed to scan downwards from the first foreground pixel in the image until a predefined number of background layer pixels are encountered. At step 312, an average $A_{down}$ of the pixel values of the background pixels that were encountered at step 310 is calculated. This average value $A_{down}$ represents the average colour of the background below the foreground pixel to be filled.

The results of the processing at steps 308 and 312 provide the average colour of the background area above and below the first pixel that is to be filled, respectively.

At step 314, a pixel value is assigned to the first foreground pixel location thereby "filling a hole defined by the first foreground pixel". The pixel value that is assigned to the first foreground pixel location is determined from the average pixel value (colour) of the background pixels above and below the first foreground pixel as calculated at steps 308 and 312.

In this embodiment, the pixel value to be assigned is generated by combining the abovementioned two average pixel values (colours), for example by taking the mean of the two average pixel values (colours), or by taking a linear interpolation between the two average pixel values (colours) according to the distance of the first foreground pixel location from the positions of the background pixels from which the two average pixel values (colours) were determined.

An advantage of taking the average pixel values above and below the to-be-filled area (the first foreground pixel location) is that the subtitles are usually in the form of one or two lines of horizontal text—that is the foreground regions are wider than they are tall. The horizontal alignment of the subtitles can mean that there are less background pixels to the side of (in the horizontal neighborhood of) the to-be-filled subtitle areas than can be expected to be available above and below (in the vertical neighborhood of) the subtitles. Furthermore, using average colors for filling, rather than directly copying pixel values from the neighboring background can result in a (vertically) smooth filled area. Such a filling method can result in less visible artifacts in the motion compensated result, particularly in the background area around foreground regions.

For example, in some embodiments, hole filling processing may be performed by assigning a pixel value to one or more foreground pixel locations associated with a foreground region, wherein the assigned pixel value is derived from background pixel values that are located in a direction that is generally perpendicular to the longitudinal direction of the foreground region. This can provide the advantage that a larger subset of background pixel values can be available for determining the pixel value that should be assigned to the foreground pixel.

In some embodiments, the orientation of the direction from which background pixel values are considered for hole-filling a foreground pixel location can be determined as the direction from the foreground pixel which has the shortest distance to a sufficient number of background pixels that are available for hole-filling. For example, if the average distance to a sufficient number of background pixels in one direction/orientation from a foreground pixel location under consideration is greater than the average distance to a sufficient number of background pixels that are available in another direction/orientation, then the orientation with the shorter average distance is selected for hole-filling. A sufficient number of pixels may be a number of pixels that satisfies a threshold condition.

Returning to the method of FIG. 3, after a pixel value has been assigned to the foreground pixel location at step 314, a determination is made at step 316 as to whether or not all of the foreground pixel locations have been filled. If not all of the foreground pixel locations have been filled, then the method moves to step 318 to identify the next foreground pixel location and the method returns to step 306 to hole-fill that foreground pixel location. It will be appreciated that the hole-filled pixel values associated with the foreground pixel locations are derived from pixel values associated with the background of the input image.

Once all of the foreground pixel locations have been filled, the method moves to step 320, where motion estimation is performed on image data that comprises a combination of the assigned pixel values at foreground pixel locations (hole-filled pixel values) and the background pixel values at background pixel locations. The motion estimation at step 320 generates a motion vector field 210. In this embodiment, image data 212 is also provided as an output and comprises the combination of the pixel values that were used for motion estimation. In some embodiments this image data 212 is also used for motion compensated processing.

Figure 4:
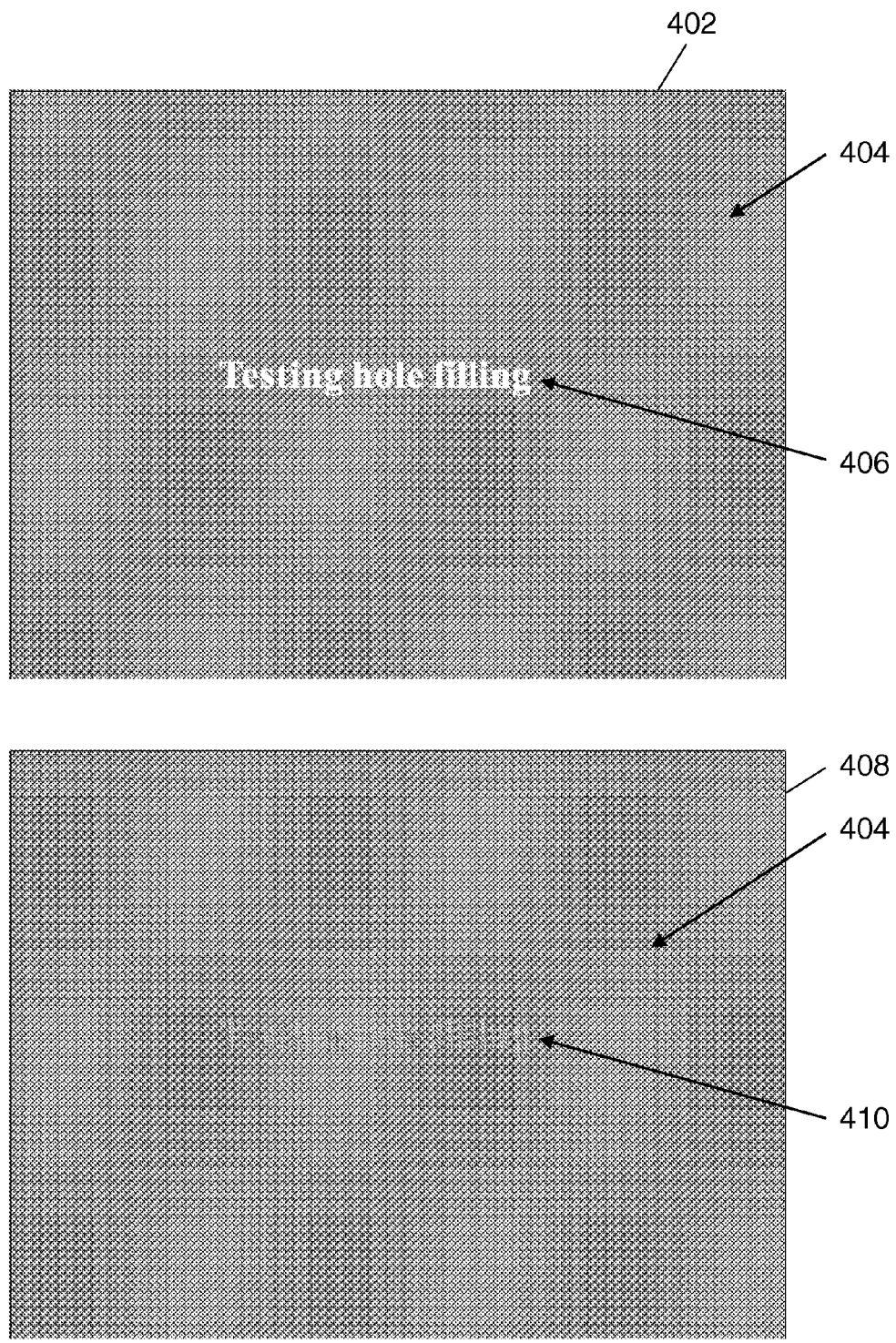
FIG. 4 illustrates schematically an input and hole-filled image according to an embodiment of the invention.

FIG. 4 illustrates an input image 402 and a "hole-filled" image 408 according to an embodiment of the invention. Input image 402 comprises a patterned background layer 404 and a foreground layer that consists of white subtitles 406. Hole-filled image 408 comprises the same background layer 404, but the value of the pixels 410 that correspond to the foreground pixel locations has been replaced by new assigned pixel values according to the method described in relation to FIG. 3. It can be seen that the filled foreground pixels 410 blend into the background pixels 404, and that the contrast between the background pixel values 404 and the filled foreground pixel values 410 has been reduced.

Data representative of the hole-filled image 408 is the image data that is used for motion estimation at step 320 and also output as image data 212 in FIG. 3.

Generating the data in this way, on which motion estimation is performed can enable improved motion vector computation. In examples using the sum of absolute differences (SAD) evaluation method for block matching, a lower SAD value can be generated for blocks that include both background pixels and filled foreground pixels, as compared to the case where the block includes the background pixels and the original foreground pixels. This is because the colour of the filled foreground regions are more similar to the colour of the background layers with which they are compared/matched, and therefore it is possible to obtain more accurate motion vectors.

It will be appreciated that other similarity metrics can be used to asses the similarity of images in accordance with embodiments of the invention, and can include squared pixel value differences, correlation, and the like. The SAD metric is described as one possible metric and should not be interpreted as limiting the scope of the invention to only the SAD metric.

A further embodiment of performing motion estimation on data derived from the image pixel values of regions of the first layer, and not on image pixel values derived from regions of the second layer is described in relation to equation (1) below.

In this embodiment, data representative of foreground pixel values is mathematically excluded from a calculation of the Sum of Absolute Differences (SAD, as described previously) when block matching to determine a best-fit motion vector. That is, the SAD only accounts for the similarity of background pixel values and not foreground pixel values. More specifically, in this example, the SAD operation excludes pixel values that are identified as representing foreground pixels in the previous frame, although it will be appreciated that in other embodiments, the SAD could exclude pixel values that are identified as representing foreground pixels in the current frame as well as, or instead of pixel values that are identified as representing foreground pixels in the previous frame.

The equation that is used to calculate the sum of absolute differences of background pixel values when comparing a block in a previous frame with a candidate block in a current frame is:

$$SAD_B(k, l, m, n) = \sum_{i,j} (|P_P(k+i, l+j) - P_C(k+i+m, l+j+n)| \times (1 - M(k+i, l+j))) \quad (1)$$

Where:

$SAD_B$(k, l, m, n) is the SAD between pixel values of background pixels of a block in a previous frame with pixel values at corresponding pixel locations in a candidate block in the current frame;

k, l identify the coordinates of the block in the previous frame;

i, j identify the coordinates of a pixel within the block;

m, n is a motion vector that identifies the offset of the coordinates from the block in the previous frame to the candidate block in the current frame;

$P_P$ is the pixel value of the pixel at location (k+i,l+j) in the previous frame;

$P_C$ is the pixel value of the pixel at location (k+i+m,l+j+n) in the current frame; and M is a binary segmentation map/foreground mask having values of either 0 or 1 at each location (k+i,l+j), where a value of 1 represents a foreground pixel in the previous frame, and a value of 0 represents a background pixel in the previous frame In some embodiments, the segmentation map M can comprise values that represent whether or not a pixel location is part of foreground or background region in the previous frame, the current frame, both frames, either frame or neither frame.

By applying equation (1), the absolute difference between a foreground pixel at location (k+i,l+j) in the previous frame is excluded from the sum as it is multiplied by zero due to the term (1−M(k+i,l+j)). This is because M will be 1 at location (k+i,l+j) as it represents a foreground pixel, and therefore (1−M) will be zero.

In this way, data representative of foreground pixel values is excluded from an SAD operation when block matching with candidate blocks. Therefore, foreground pixel value data does not influence the selection of the best-fit motion vector for a block and an improved motion vector field can be determined.

Further, when the mask M represents a probabilistic value between 0 and 1 indicating to what extent a pixel is considered to belong to a layer, the SAD calculation formulated in (1) still holds, as it implements a gradual exclusion of the pixels that are considered with a higher probability to belong to the foreground, from the SAD result.

For blocks that contain a number of foreground pixels, calculating the SAD as described above can contain fewer number of pixel difference values than for blocks that have no foreground pixels. In some embodiments, the SAD can be normalized by the number of summed-up pixel difference values, before SAD of candidate blocks are compared. However, in some embodiments, excluding all data representative of foreground pixels from the SAD operation can become problematic if one of the two blocks of pixels that are to be compared comprise mostly or entirely foreground pixels. If the images contain mostly foreground pixels (which are to be excluded from SAD), then the block matching will be based on only a few pixel values, and the SAD results can be unreliable and sensitive to noise and as a consequence, inaccurate motion vectors can be determined. The inaccuracies in the motion vectors can be due to the small sample of data that is used in the SAD operation. Furthermore, if the blocks contain only foreground pixels, then all pixel values are excluded from SAD. In such an example, the SAD will equal 0 for one or more candidate blocks that do not accurately reflect the movement of the block. This can also lead to inaccurate motion vectors being determined.

In order to address the above-mentioned issues, a combination of the processing illustrated in FIG. 3 with the processing described in relation to equation 1 can be used. This example uses block matching and SAD to generate motion vectors. In this embodiment, the image data which is used for SAD processing is the hole-filled image data that is generated by the method of FIG. 3.

The sum of absolute differences in the embodiment can be calculated using the following equations:

$$SAD_F(k, l, m, n) = \sum_{i,j} \binom{|P_{PF}(k+i, l+j) - P_{CF}(k+i+m, l+j+n)| \times}{MAX(M_{PF}(k+i, l+j), M_{CF}(k+i+m, l+j+n))} \quad (2)$$

$$SAD_B(k, l, m, n) = \sum_{i,j} \binom{|P_{PF}(k+i, l+j) - P_{CF}(k+i+m, l+j+n)| \times}{(1 - MAX(M_{PF}(k+i, l+j), M_{CF}(k+i+m, l+j+n)))} \quad (3)$$

$$SAD_{TOTAL}(k, l, m, n) = \quad (4)$$
$$(1-c) \times SAD_B(k, l, m, n) + c \times SAD_F(k, l, m, n)$$

Where:

$SAD_F(k, l, m, n)$ is the SAD between pixel values of pixels of a block in a previous hole-filled frame with pixel values of corresponding pixel locations in a candidate block in the current hole-filled frame, taken over pixel pairs of which at least one of the two pixels (either the pixel from previous frame or pixel from the current frame) belongs to the filled foreground;

$SAD_B(k, l, m, n)$ is the SAD between pixel values of pixels of a block in a previous hole-filled frame with pixel values of corresponding pixel locations in a candidate block in the current hole-filled frame, taken over pixel pairs in which both pixels belong to the background;

k, l identify the coordinates of the block in the previous frame;

i, j identify the coordinates of a pixel within the block;

m, n is a motion vector that identifies the offset of the coordinates from the block in the previous frame to the candidate block in the current frame;

$P_{PF}$ is the pixel value of the pixel at location (k+i,l+j) in the previous hole-filled frame;

$P_{CF}$ is the pixel value of the pixel at location (k+i+m,l+j+n) in the current hole-filled frame;

$M_{PF}$ and $M_{CF}$ are binary segmentation maps/foreground masks having values of either 0 or 1 at each location (k+i,l+j) or (k+i+m,l+j+n), respectively, where a value of 1 represents a foreground pixel and a value of 0 represents a background pixel in the previous frame and the current frame, respectively;

$SAD_{TOTAL}$ is the total sum of absolute differences for a block, and comprises an influence of the SAD of the foreground pixels and an influence of the SAD of the background pixels; and c is a weighting factor, which defines the relative influence of the foreground SAD ($SAD_F$ calculated using the filled foreground pixels) on the total SAD ($SAD_{TOTAL}$).

In this example, a weighting factor of c=0.2 prescribes a relatively weak influence of the foreground SAD ($SAD_F$) on the total SAD ($SAD_{TOTAL}$) compared with the influence of the background SAD ($SAD_B$), although it will be appreciated that any other constant or adaptive value can be used to control the relative influence of the SAD of the foreground pixels and background pixels to the total SAD for a block.

It will be appreciated that in other embodiments, one or more segmentation maps could be used in different ways. For example segmentation maps could be used so that the foreground element of the SAD is taken over pixel pairs in which both pixels belong to the foreground, or can be taken over pixel pairs in which either of the pixels belongs to the foreground. The same can be applied for the background element of the SAD.

In the embodiment described above, the hole-filled image pixel values $P_{PF}$ and $P_{CF}$ are used to calculate both the SAD for the foreground ($SAD_F$) and background ($SAD_B$). In other embodiments, the input image pixel values $P_P$ and $P_C$ (see equation (1)) can be used to calculate the background SAD ($SAD_B$) that is used to calculate the total SAD in equation (4).

The invention claimed is:

1. A method of processing video signals representing multiple images, comprising:

identifying pixels in an image that should not be included in performing motion compensation of images in the multiple images;

using a hole-filling process to replace the identified pixels with values generated from values in a background image to form a hole-filled image;

performing motion estimation on the hole-filled image to generate a motion vector field;

using the motion vector field to perform motion-compensated processing on the hole-filled image; and combining a result of the motion-compensated processing with the identified pixel to generate an output image.

2. The method of claim 1, wherein the background image represents background objects in the image, and the identified pixels represent foreground objects in the image.

3. The method of claim 2, wherein the pixels represent stationary objects.

4. The method of claim 1, wherein the pixels in the hole-filled image comprise
assigned pixel values derived from pixel values at pixel locations in the vicinity of the identified pixels.

5. The method of claim 4, wherein performing motion estimation comprises processing identified pixel values derived from pixel values associated with a first image and processing identified pixel values derived from pixel values at corresponding locations in a second image, wherein the first and second pixel locations represent pixel pairs,
further comprising for each pixel pair wherein both pixel locations are associated with a first image layer:
calculating a first pixel similarity value between pixel values at the pixel locations identified by the pixel pair;
combining each of the first pixel similarity values to generate a first similarity metric value;
for each pixel pair wherein either of the pixel locations are associated with a second image layer:
calculating a second pixel similarity value between assigned pixel values for the pixel locations of the pixel pair that are associated with the second layer, and the pixel value at the pixel location of the pixel pair that is associated with the first image layer, if there is one; and
combining each of the second pixel similarity values to generate a second similarity metric value;
multiplying the first similarity metric value by a first constant to generate a first weighted similarity metric value, and multiplying the second similarity metric value by a second constant to generate a second weighted similarity metric value; and
adding the first weighted similarity metric value to the second weighted similarity metric value to generate a total similarity metric value.

6. The method of claim 5, wherein one or more of the similarity metrics are calculated using a sum of absolute differences.

7. The method of claim 6, wherein the first constant is greater than the second constant.

8. The method of claim 7, wherein the assigned pixel values are derived from pixel values associated with the first image layer that are located in a direction that is generally perpendicular to the longitudinal direction of the foreground region.

9. The method of claim 7, wherein the assigned pixel value is derived from pixel values associated with the first image layer that are located in a vertical direction from the pixel locations associated with the second layer in the first image.

10. The method of claim 1, wherein dividing the image into regions and associating a first plurality of regions of the image with a first image layer and a second plurality of regions of the image with a second image layer, comprises segmentation processing.

11. The method of claim 1, wherein the identified pixels are in an overlay layer.

12. The method of claim 11, wherein the overlay layer represents an image selected from a group consisting of subtitles, a logo, a user-interface menu, a stationary object, and running text.

13. The method of claim 12, wherein the method comprises part of a picture-rate up-conversion operation.

14. The method of claim 12, wherein the motion estimation comprises identifying a spatial correspondence between image areas of consecutive images represented by the video signals.

15. The method of claim 14, wherein identifying a spatial correspondence between image areas of consecutive images represented by the video signals comprises block matching between the consecutive images in which similarity between the block is assessed using a sum of absolute differences (SAD) metric.

16. The method of claim 15, wherein at least some of the regions of the background image represent moving objects.

17. Data processing apparatus comprising a non-transitory computer readable storage medium containing program steps, which, when executed by the data processing apparatus, performs the method of claim 1.

18. A display device comprising the data processing apparatus of claim 17.

19. A computer program instantiated on a non-transitory computer readable storage medium, which, when executed by the data processing apparatus, performs the method of claim 1.

20. A non-transitory computer program carrier, having stored thereon the computer program of claim 19.

* * * * *